United States Patent
Schwerdtner et al.

(10) Patent No.: US 7,425,069 B2
(45) Date of Patent: Sep. 16, 2008

(54) AUTOSTEREOSCOPIC MULTI-USER DISPLAY

(75) Inventors: Armin Schwerdtner, Dresden (DE); Alexander Schwerdtner, Dresden (DE); Bo Kroll, London (GB)

(73) Assignee: SeeReal Technologies GmbH, Dresden (DE)

( * ) Notice: Subject to any disclaimer, the term of this patent is extended or adjusted under 35 U.S.C. 154(b) by 386 days.

(21) Appl. No.: 10/569,434

(22) PCT Filed: Jan. 8, 2004

(86) PCT No.: PCT/DE2004/000010

§ 371 (c)(1),
(2), (4) Date: Feb. 23, 2006

(87) PCT Pub. No.: WO2005/027534

PCT Pub. Date: Mar. 24, 2005

(65) Prior Publication Data

US 2006/0279567 A1    Dec. 14, 2006

(30) Foreign Application Priority Data

Aug. 26, 2003    (DE) ............................. 103 39 076

(51) Int. Cl.
*G02B 27/24*    (2006.01)

(52) U.S. Cl. ............................. 353/7; 349/15; 359/466

(58) Field of Classification Search .................... 353/7; 349/15; 359/463, 464, 472, 475
See application file for complete search history.

(56) References Cited

U.S. PATENT DOCUMENTS 5,392,140 A * 2/1995 Ezra et al. ............... 349/15

(Continued)

FOREIGN PATENT DOCUMENTS

EP    0656555    6/1995

(Continued)

OTHER PUBLICATIONS

K. Toyooka, et al., "13.2: The 3D Display Using Field-Sequential LCD with Light Direction Controlling Back-light", SID 01 Digest, ISSN/0001-0966X pp. 174-177.

*Primary Examiner*—William C. Dowling
(74) *Attorney, Agent, or Firm*—Saul Ewing LLP

(57) ABSTRACT

The invention relates to an autostereoscopic multi-user display comprising a focussing element and a selectable display for the time-sequential representation of 2D and/or 3D images. When viewed in the direction of the observer, said display contains a sweet-spot unit and an image matrix, which function separately from one another. The sweet-spot unit focuses a light distribution with a large surface area onto the eyes of the observer by means of a lateral sweet-spot extension, which is greater than or equal to the distance between the eyes of the observer. The sweet-spot bundle traverses the imaging matrix completely in a uniform manner on its way to the observer(s) and is thus modulated by the image content of the image matrix. The size of the sweet spot reduces the need for tracking precision. The sweet-spot unit consists of an illumination and imaging matrix. The illumination matrix is situated approximately in the front focal distance of the imaging matrix and can consist of backlight and an electronic shutter with controllable apertures or can be another suitable component. According to one embodiment, the shutter and the image matrix are identical in their pixel and sub-pixel geometry. The imaging matrix can be a double-lenticular, holographic optical element or similar.

10 Claims, 8 Drawing Sheets

U.S. PATENT DOCUMENTS

| | | | |
|---|---|---|---|
| 5,465,175 A * | 11/1995 | Woodgate et al. | 359/463 |
| 6,366,281 B1 | 4/2002 | Lipton et al. | 345/419 |
| 6,445,406 B1 * | 9/2002 | Taniguchi et al. | 348/51 |
| 6,449,090 B1 * | 9/2002 | Omar et al. | 359/465 |
| 7,298,552 B2 * | 11/2007 | Redert | 359/463 |

FOREIGN PATENT DOCUMENTS

| | | |
|---|---|---|
| EP | 0881844 | 12/1998 |
| JP | 10-161061 | 6/1998 |
| JP | 11-289558 | 10/1999 |
| WO | WO03013153 | 2/2003 |
| WO | WO03019952 | 3/2003 |
| WO | WO 03019952 | 3/2003 |
| WO | WO03053072 | 6/2003 |

* cited by examiner

AUTOSTEREOSCOPIC MULTI-USER DISPLAY

CROSS REFERENCE TO RELATED APPLICATIONS

This application claims the priority of PCT/GB2004/000010 filed on Jan. 8, 2004 and DE 103 39 076.6 filed on Aug. 26, 2003, the entire contents of which are hereby incorporated in total by reference.

The present invention relates to an autostereoscopic multi-user display which consists of a focussing element for focussing homogeneous light to form a pencil of rays directed towards the eyes of one or multiple observers, and a switchable display for sequentially showing two-dimensional images or image sequences with monoscopic or stereoscopic contents, said display modulating the light emitted by the focussing element with the help of said image contents.

In order to meet future demands of the market, autostereoscopic multi-user displays must conform with the high quality standards imposed on 2D displays today. Users of such 3D displays consider the following features to be essential: the ability to support multiple observers (multi-user system), possibility of free and independent movement of the individual users, and selective access to several contents or programmes in a 2D and 3D mode. Further demands are derived from 2D display technology: high resolution, robustness, reliability, little depth, support of practically all common video formats, including camera and stereo-camera, and low costs.

Multi-user displays are devices which can be used by multiple observers situated at any position in a viewing space to view 3D contents simultaneously and independently of each other. This can be achieved by spatial or temporal interdigitation of partial images.

Several solutions for autostereoscopic displays based on such spatial multiplexing systems have been proposed.

As regards displays with spatial interdigitation (multi-view displays), multiple adjoining pixels or their colour sub-pixels are grouped to form pixel clusters with each pixel containing a 3D scene from a different perspective (see U.S. Pat. No. 6,366,281, DE 101 45 133). An image separating mask, known as barrier, lenticular or other optical element, projects the pixel contents of each pixel cluster into space in a fan-shaped manner. Each fan contains the image content of the 3D scene from a certain perspective. If the two eyes of an observer are located in neighbouring fans, the observer perceives the desired stereoscopic representation. However, this arrangement suffers from a low resolution. The overall resolution is not determined by the resolution of the image matrix, but by the more coarse pixel cluster resolution. An image with eight perspectives will reduce the resolution to ⅛, for example. Another disadvantage is that a given distance must be maintained between the observer and multi-view display in order to avoid cross-talking with pseudo-stereoscopic effects.

There is also known an autostereoscopic display with temporal interdigitation (Neil A. Dodgson et at.: A 50" time-multiplexed autostereoscopic display, Proc.SPIE 3957, "Stereoscopic Displays & Applications XI"). In that display, light sources arranged next to each other are projected with the help of a Fresnel lens into the viewing plane in the form of a light-box. A transmissive LCD panel is disposed next to the Fresnel lens, said LCD panel modulating the light using the image information. The light sources and thus the light-box are turned on one after another, while the LCD panel switches to the image content corresponding to an image of a 3D scene from the given perspective. An observer can view the scene from the light-box, seeing a different perspective with each eye on the LCD panel. Because the same scene is represented, just seen from different perspectives, the observer perceives a stereo image. The same also applies to several observers. This method is known as time-multiplexed multi-view, because the different perspectives of a scene are not shown simultaneously, but one after another. In contrast to the common multi-view method, this method maintains the high resolution of the display.

However, all temporal interdigitation methods have in common a high data transmission rate and high refresh rate. Assuming there are ten positions in the light-box, the two parameters increase tenfold. This renders most of today's TFT-based transmission displays inappropriate for future autostereoscopic multi-user applications.

In a variation of this method, the information of a CRT is projected through a shutter onto a Fresnel lens. This tens, in turn, projects the shutter into the light-box. The CRT combines two functions in this method: it acts as information carrier and light source at the same time.

The high CRT refresh rate is maintained, because no transmissive light modulator is required. CRT monitors are much faster than most TFT displays. However, at least ten perspectives are desired with the multi-view method. This is problematic even for fast high-resolution CRT monitors as regards the data transmission rate. Another difficulty is the great image brightness needed, in this example the required intensity increases tenfold. To be able to view the scenes without breaks caused by transition to other segments of the light-box, even more than 10 perspectives are necessary. Even customised CRT monitors with such short switching times easily go beyond technological and economic feasibility. Moreover, such devices are voluminous, which reduces their market acceptance.

Multi-view devices require special multi-view cameras for general streaming video, but such cameras only exist in the form of special developments. The use of multi-view devices in TV applications is limited by both this fact and the high data transmission rate.

There are recent publications which suggest solutions for the above-described demands on today's autostereoscopic multi-user displays.

EP 0 881 844 A2 discloses a single-user display with light source tracking. This display works in a time-multiplexed mode. Two adjoining segments of a light source pair are provided for the left and right eye of an observer. If a segment for a right eye of a observer is turned on, for example, a first lenticular projects this segment in a multitude of images onto the diffusor plate. This plate now acts as a secondary light source, which thanks to its diffusion property supplies the display with the right stereo image through all lenses of the second lenticular, whereby the light is focused onto the right eye of the observer. Immediately after, the light source pair is switched to the segment for the left eye and the display panel is switched to the left image content. If the observer moves out of the stereo zone, the second light source pair, which corresponds with the current zone, is turned on and the display panel is switched to right or left image contents. However, it is disadvantageous to use a diffusor plate as it generally prevents multi-user operation, since the diffusor plate with its multitude of secondary light sources is represented in periodical continuation through the second lenticular.

WO 03/019952 A1 (identical to US 2003/0039031) discloses a tracking-based method for multiple users with optional access to 2D and 3D programmes. This method features, in addition to the display, a directivity optics which comprises two lens arrays including a shutter. The directing optical system focuses the display content to the eyes of one or more observers, said display at the same time forming the light source. Each lens of the first lens array focuses one pixel each of the display onto the shutter, which holds open one segment per tens pitch for one observer. Now, this segment is projected to the eye of the observer by a corresponding lens of the second tens array, which has substantially the same pitch. If a observer moves, a position detector transmits the observer's new position, which determines which shutter segments, which are responsible for projecting the display pixels onto the observer's eyes, are to be opened. In the 3D mode using the time-multiplex method, a right and left image are projected to the right and left eye, respectively, one after another. If there are multiple observers, multiple segments are activated. In the 2D mode, all shutter segments can be activated.

Although all features of an autostereoscopic display are generally available, considerable difficulties are encountered when combining them to realise an autostereoscopic multi-user display. The shutter is required to have an extremely high resolution. For example, one embodiment of said patent having 100 perspectives requires a segment width of 2.5 µm, assuming a pixel pitch of 0.25 mm used in common UXGA displays. Assuming there are 1,600 columns, 160,000 controllable segments would be necessary per line.

Projection methods according to WO 03/013153 A1 also combine information carrier and light source. The image information is supplied to elements of a deflection unit through segments of a switchable, high-resolution barrier so that it is focused onto the observer(s). An additional Fresnel lens may be used to focus the light from the projection unit. The great depth of the arrangement and the high intensity of the projection unit are disadvantages of this method.

With technologies using three components, namely collimated back light source, directivity unit to focus the light onto the eyes of the observer(s) and transmissive panel, light source and information carrier are separate; however, complicated backlighting with directed light is required, supplied either by a laser or a point light source. The above-mentioned directivity unit will still be required additionally, in order to focus the light onto the eyes of the observer(s).

Backlighting with diffuse light sources and directing the light using a lens requires a great dept of the device because of the large focal distance of the lens required to avoid aberration.

WO 03/053072 A1 discloses a three-dimensional backlight for precise focusing of the light onto the eyes of the observer(s) not only in lateral direction, but also for various distances between observer and display. Several configurations of this three-dimensional backlight are described, such as LCD panels arranged one after another, or addressable reflecting areas. These addressable 3D backlight light sources illuminate a lens which forms the projection system that projects the light sources onto one or more observers and tracks their movement, similar to the Dodgson method using a plane light source (see above). On its way to the observers, the light runs through a light modulator which alternately provides the left image to the left eyes and the right image to the right eyes, said images being selected from one or more 3D programmes.

The disadvantage of this method is the great depth of the autostereoscopic display caused by the three-dimensional backlight and the projecting lens which has an extreme diameter. In order to confine aberration of such large lenses outside the optical axis, a sufficiently large focal distance must be chosen, thus making the appliance very deep. Further, a three-dimensional backlight is difficult to achieve.

EP 0 656 555 A discloses a light source tracking method. Light is transmitted through two display panels arranged at right angles. A semi-transmissive mirror is disposed at an angle of 45° between the two display panels. A light source each for the left and right eye of the observer is projected through each of the two panels through a optical focusing system, and through the semi-transmissive mirror for one eye and reflected by the semi-transmissive mirror for the other eye. One panel contains the image information for the right eye, the other panel contains the image information for the other eye.

If the observer moves, his position is detected by a position detector and the light sources are tracked so that the observer always perceives a stereo image. If there are several observers, several light sources are activated. Both panels contain a right and left image at the same time.

Leaving aside the single-user device described in EP 0 881 844 A2 and the pure 3D multi-view displays it can be noted that the prior art described above is in most cases characterised by displays which simultaneously act as information carrier and light source (WO 03/019952, N. A. Dodgson et al.). Further, it becomes evident that all subsequent optical units are adapted to the pixel pitch of the display. Summarising, these two display-specific features have the following disadvantages:

First, the components are incompatible for different displays. Displays with geometrical differences, such as resolution or size, require a new design. In particular, new shutters are required. Secondly, the adjustment based on the display pixels requires an extremely high accuracy and has great demands on robustness. Thirdly, only displays which have sufficient brightness can be used. Fourthly, the dimensions of the shutter segments in relation to the pixel pitch must be very small, so that a practical realisation is difficult and expensive.

The displays according to WO 03/053072 A1, EP 0 656 555 A and WO 03/013253 A1 have the additional disadvantage that they are very deep, for reasons explained above, so that it is not possible to construct a flat autostereoscopic multi-user display.

It is an object of the present invention to provide an autostereoscopic multi-user display which is characterised by minimum cost and labour for the individual components and their adjustment to each other, by flat design, compatibility of 3D components and displays, sufficient brightness and the possibility to reduce the extreme accuracy demands required by prior art devices.

Another object is to separate lighting elements and information-carrying image matrix in the multi-user display, said display being able to provide both high-resolution 2D images and 3D scenes simultaneously and/or optionally, and allowing multiple observers to view the provided contents independently of each other, even if they change their positions.

This objective is solved by the features of claim 1. An autostereoscopic multi-user display according to the present invention contains a focusing element, which is designed to form a sweet-spot unit, and which focuses the light with an individually pre-selectable extension as sweet spots onto positions which correspond with the observers' eyes. This is achieved by arranging the sweet-spot unit and image matrix behind each other (in the direction of the light propagation), whereby the light of the sweet-spot unit is projected onto the image matrix as homogeneously as possible. A sweet-spot has a lateral extension which may be equal to or greater than the distance between the eyes of the observer(s). The sweet-spot size has the advantage of reducing the otherwise strict demands on tracking accuracy. The light does not have to be focused to the eye pupils, it is sufficient to position it with sweet-spot accuracy. The sweet-spot is turned off for eyes which do not receive information. It thus turns into a dark spot.

The sweet-spot unit is run in synchronism with the image matrix, so that in the case of multiple users a pure 2D image or a left and right stereo image can be selected from a range of available programmes.

According to the invention, the sweet spot unit comprises an illumination matrix and a projection matrix. The illumination matrix is disposed about in the front focus of the lenticular elements of the projection matrix and preferably consists of a ordinary backlight and an electronic shutter having controllable openings, said shutter being a LCD or a ferroelectric LCD (FLCD) panel, for example.

According to this invention, the synchronisation of shutter an image matrix is facilitated considerably by using LCD panels of like design, so that shutter and image matrix are identical as regards their pixel and sub-pixel geometry. Unlike the information-carrying LCD panel in the case of a colour representation, the shutter does not contain a colour matrix. The sub-pixels of the shutter can be controlled, so that the number of controllable positions is increased three-fold.

The size of the openings of the shutter may vary, for example by clustering adjoining sub-pixels. Thanks to the separation of the individual components as proposed in the present invention it is possible to reduce the demands on the resolution of the shutter. According to this invention, the illumination matrix may only consist of one component, said component being an active light-emitting illumination matrix with controllable structures arranged in line or in a matrix. Examples are organic LED (OLED) panels or projection units based on a DLP. According to this invention, a Fresnel lens and/or a diffusing layer may be arranged between projector and projection matrix.

The projection matrix aims to project the on elements of the illumination matrix into the space in front of the display in sweet spots. It may be formed in various ways, wholly or partially as a lenticular, dual lenticular, lens array, compound lens system or holographic optical element.

Finally, according to this invention, lenticulars, lens arrays and holographic optical elements can be combined or disposed one after another.

In order to suppress aberration, the elements of the projection matrix may also form a doublet or triplet lens system or other sequential lens systems, similar to optical systems with only one optical path.

According to this invention, the projection matrix may wholly or partly be made of a material the optical properties of which can be controlled, such as a polymer.

In order to avoid Moiré effects, a diffusing medium, such as a diffusing foil, is disposed in front of or behind the image matrix.

Should in the following description only one observer be mentioned, this one observer shall of course also represent a group of observers.

The autostereoscopic multi-user display according to this invention is illustrated with the help of embodiments and is described below in detail in conjunction with the accompanying drawings, wherein FIG. 1 shows a general arrangement of the autostereoscopic multi-user display, which consists of a sweet-spot unit and image matrix for the right eye of a observer;

The autostereoscopic multi-user display as shown in FIGS. 1-8 is in the stereo mode based on light source tracking using a sweet-spot unit. The observers are provided the stereo information in sequential frames, that is in a time-sequential manner. This way of representing stereo information is very common and also employed by the so-called shutter method and by the polarisation glasses method. When employing this method with autostereoscopic multi-user displays, the resolution is maintained and not reduced by a factor that represents the number of perspectives, as in the multi-view method. The resolution is the same as the resolution of the image matrix.

Figure 1:
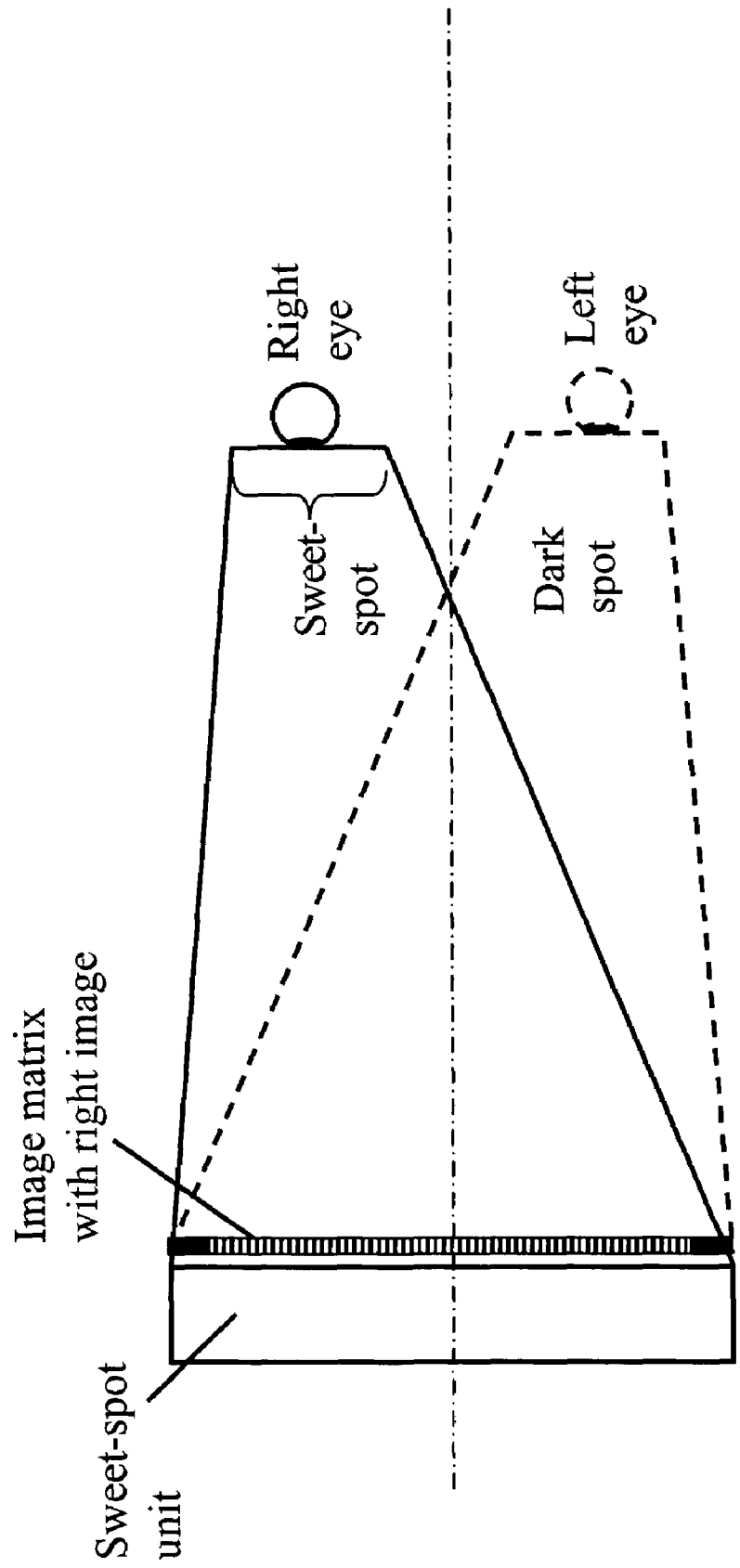

FIG. 1 shows a general arrangement of the autostereoscopic multi-user display according to the present invention in the 3D mode for one observer, said multi-user display comprising a sweet-spot unit and an information-carrying image matrix. Unlike in prior art flat multi-user displays, these two components are separate units. Seen in the direction of light propagation, the sweet-spot unit is disposed in front of the image matrix.

The sweet-spot unit, which is functionally separate from the image matrix, focuses the light onto one or several observers' eyes, in the example of FIG. 1 onto the right eye of the observer(s). The light is thereby neither focused in a point nor in a line, but has the extension of the sweet spot, which may be as large as the distance between the observer's eyes or even exceed this distance in lateral direction. This allows the observer to perceive an undisturbed stereoscopic image even if he moves a few centimeters, without the need to initiate tracking. The demands on the tracking system can thus be reduced drastically, thus improving the robustness of the display. On its way to the observer, the light runs through the image matrix which modulates it with an image information. Here, at the moment shown in FIG. 1, the image matrix contains the image information for the right eye of a observer. The eye may move within the bounds of the sweet spot, whereby the image matrix always remains visible without any limitation. The sweet spot for the left eye is turned off at that moment. In the following description, it will be denoted as dark spot.

Figure 2:
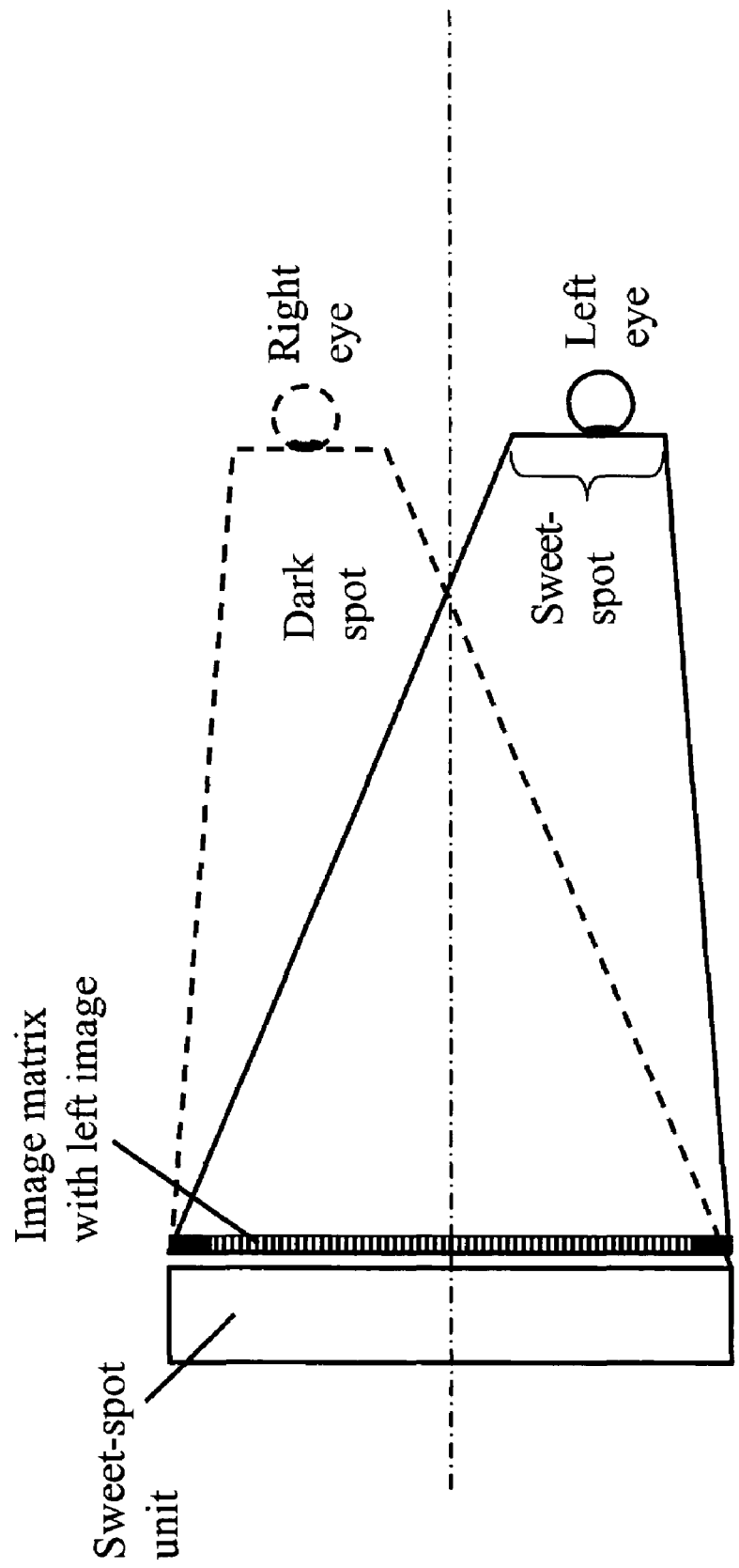
FIG. 2 shows a general arrangement similar to FIG. 1, but for the left eye of a observer.

FIG. 2 shows the subsequent focusing of the sweet-spot unit onto the left eye. On its way to the sweet-spot for the left eye, the sweet-spot pencil, which carries no information itself, is now modulated with the left stereo image by the image matrix. The sweet-spot for the right eye is now turned off to form a dark spot. The image information is changed over between left and right eye stereo image in synchronism with the change over from sweet spot to dark spot and vice versa. If the image information of the image matrix for the right and left eye and the synchronised focussing onto the right and left eye is changed over at a sufficient frequency, the eyes can not resolve the image information presented to them into temporal sequences. Right and left eye see the image information in stereo, without any cross-talking effects.

Figure 3:
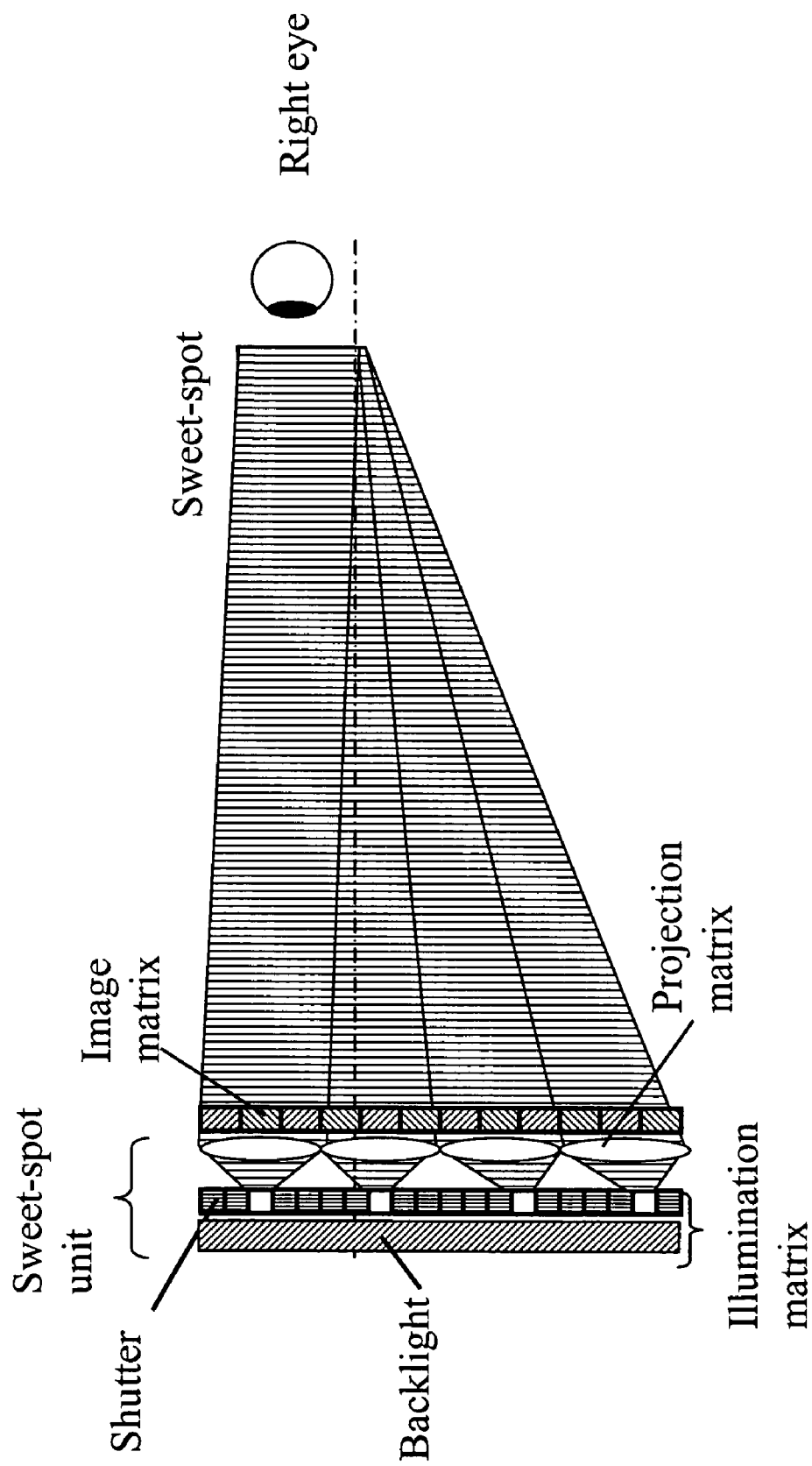
FIG. 3 is a schematic view of the illumination matrix controlled to generate a sweet spot for one eye of the observer.

FIG. 3 is a schematic view of the illumination matrix used to generate a sweet-spot for one eye of the observer. The arrangement of the illumination matrix is also shown in detail. The sweet-spot unit comprises an illumination matrix and a projection matrix. In this embodiment the illumination matrix consists of a backlight and shutter. This shutter may be a component based on light valves, preferably a LCD or FLCD panel. In this embodiment, the projection matrix consists of a lenticular with a focal plane being about identical to the plane of the illumination matrix. If a small opening in the illumination matrix is opened, each point in the opening produces a parallel pencil of rays, in this embodiment leaving the corresponding lens of the projection matrix in the direction towards the right eye of a observer. The entire opening thus generates the extended-sweet spot for the observer.

Figure 4:
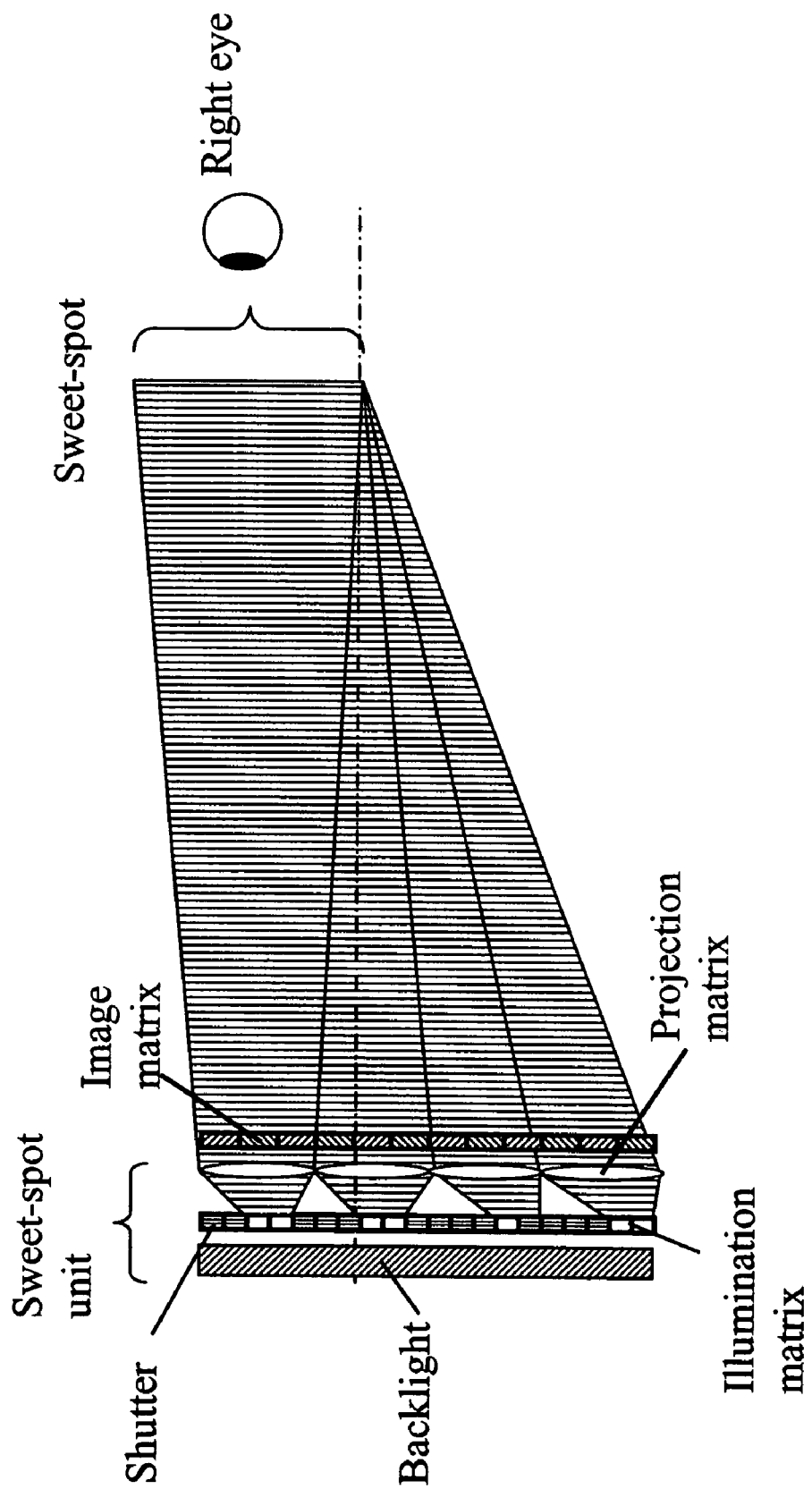
FIG. 4 is a schematic view of the illumination matrix similar to FIG. 3, but controlled to generate an enlarged sweet spot.

FIG. 4 shows how the extension of the sweet-spot can be broadened by modifying the illumination matrix in the sweet-spot unit. To achieve this, multiple openings in the illumination matrix (in a shutter in this embodiment) are opened. The eye of a observer may move within the bounds of the extended sweet-spot, without losing sight of the entire dimension of the display. Size and transmission of the shutter openings can be controlled.

Figure 5:
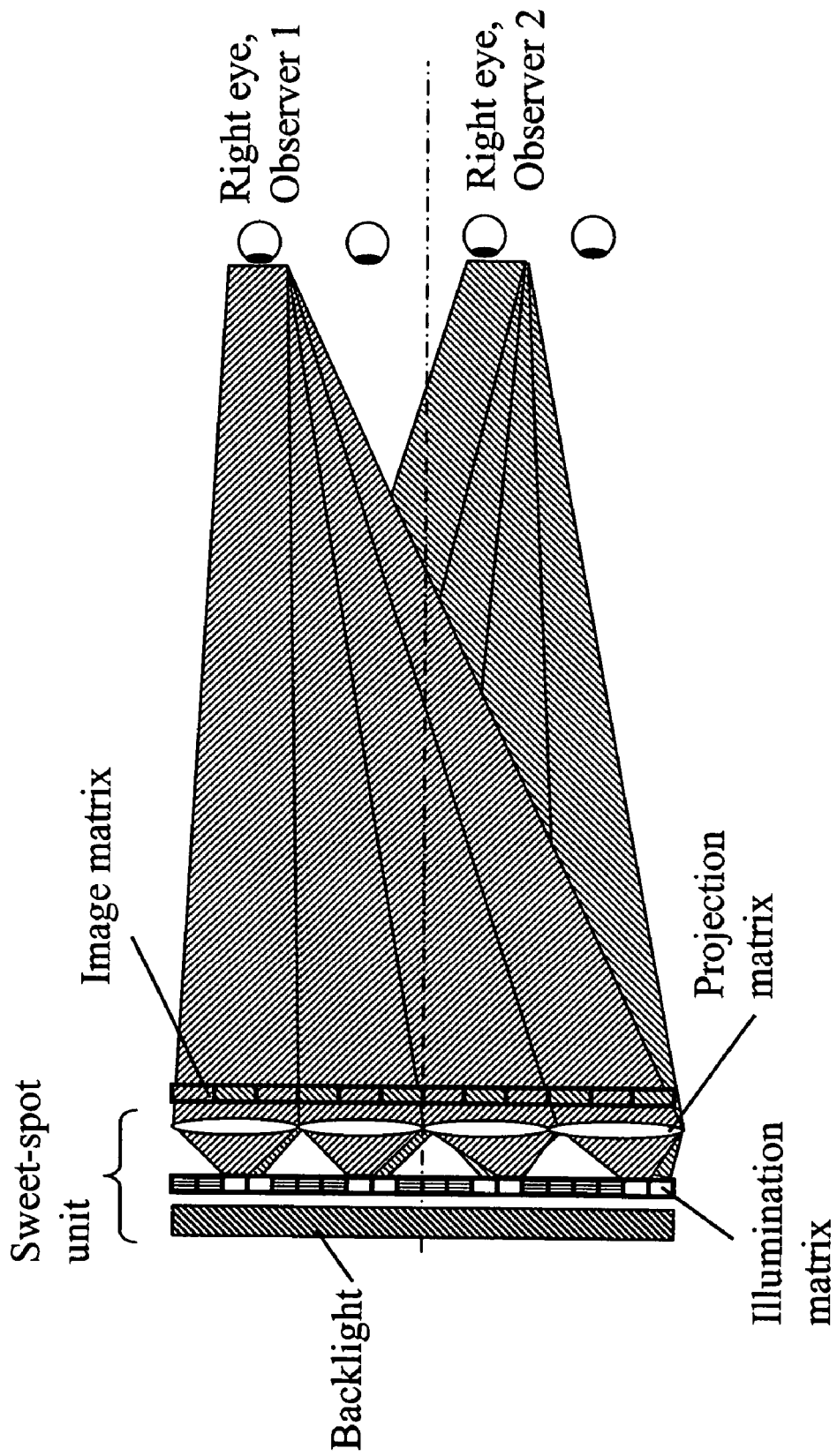
FIG. 5 is a schematic view of the generation of sweet spots for two observers who are provided 3D image contents.

FIG. 5 shows an arrangement for several observers of a scene in the 3D mode with the example of two observers. The display panel contains the right stereo image for the two observers. At the same time as the image information is provided, sweet spots are generated for the right eyes of the two observers. At the next moment, the image matrix contains the left stereo image and the sweet spots are directed to the left eyes of the observers. Matching several image contents and the corresponding sweet spots for observers of a pure 2D image, and for an optional matching of observers who want to see different contents, e.g. different programmes, or for an optional access to a 2D mode of 3D contents is carried out analogously in the same way.

Figure 6:
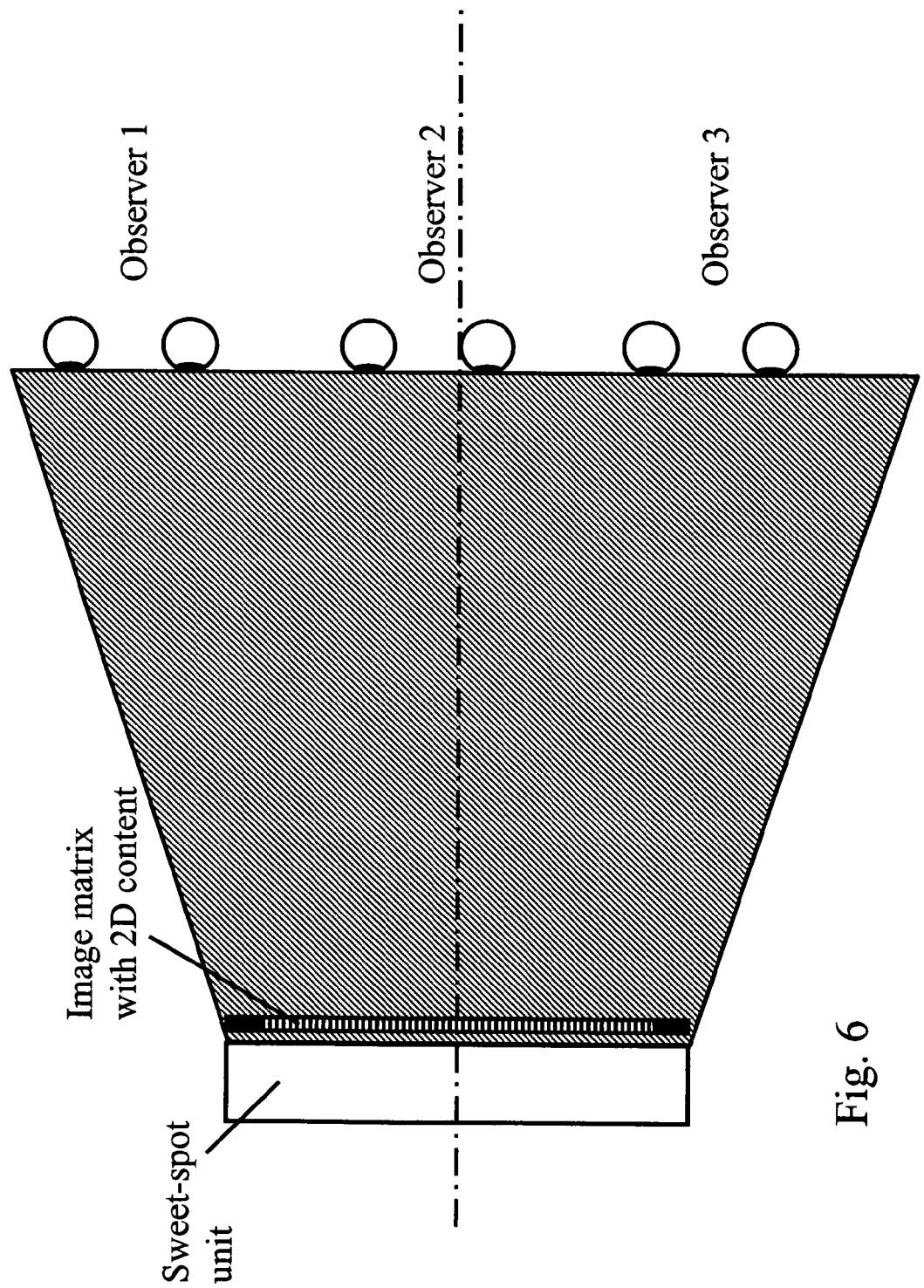
FIG. 6 is a schematic view of the representation of a 2D image content in a large space and for multiple users.

A complete change of the autostereoscopic display to a pure 2D mode can be achieved by switching the shutter to a fully transparent mode, as shown in FIG. 6. This leads to a uniformly bright illumination of a large area in the viewing space.

Figure 7:
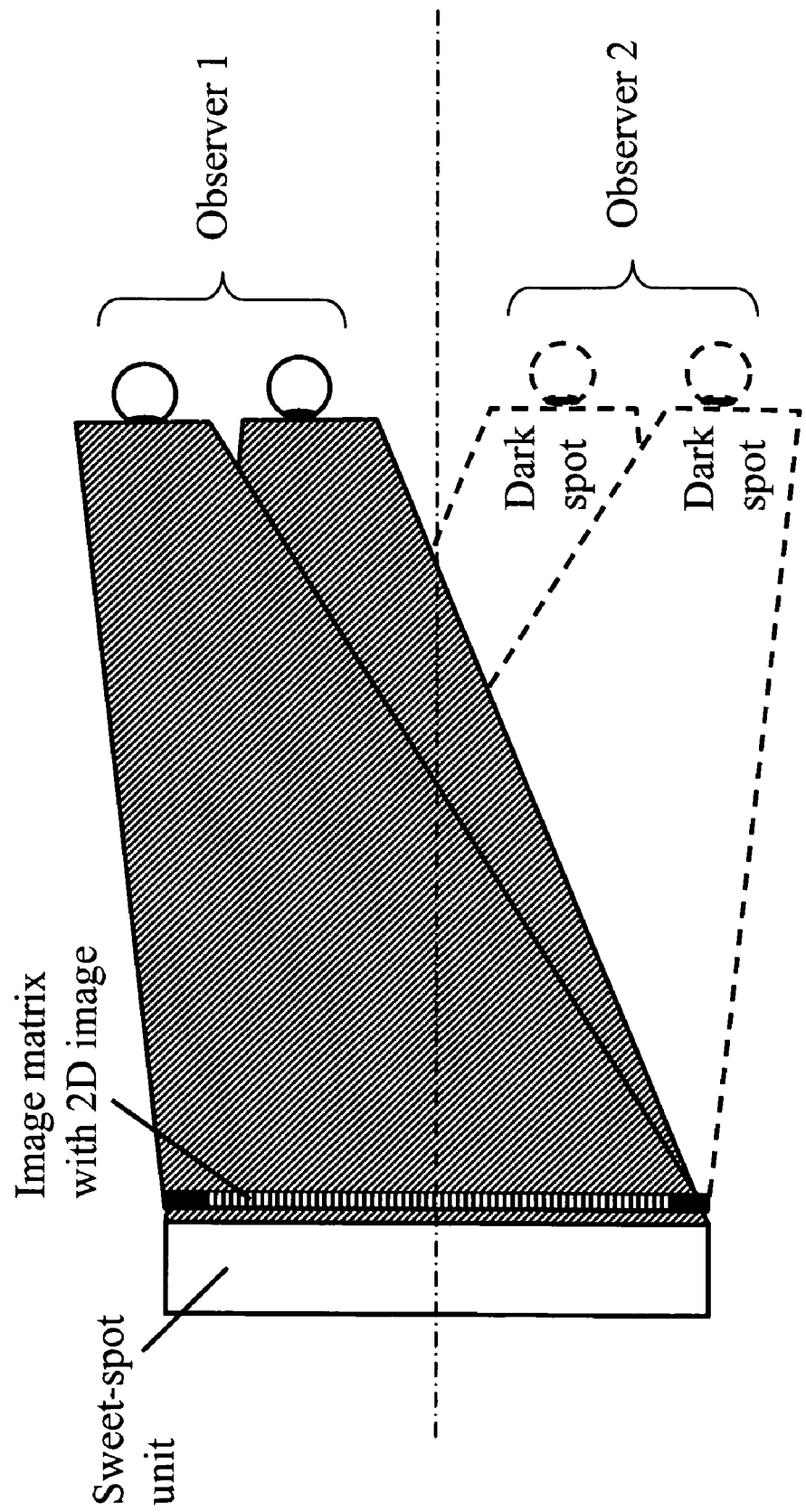
FIG. 7 is a schematic view similar to FIG. 6, but where one observer is provided information and the other observer is provided a dark spot.

If information is to be withhold for one observer, it is sufficient to turn the corresponding sweet spots into dark spots. FIG. 7 shows this for 2D information. Observer 1 (e.g. a bank clerk) has access to the information, while the display appears dark for observer 2 (e.g. a customer).

Figure 8:
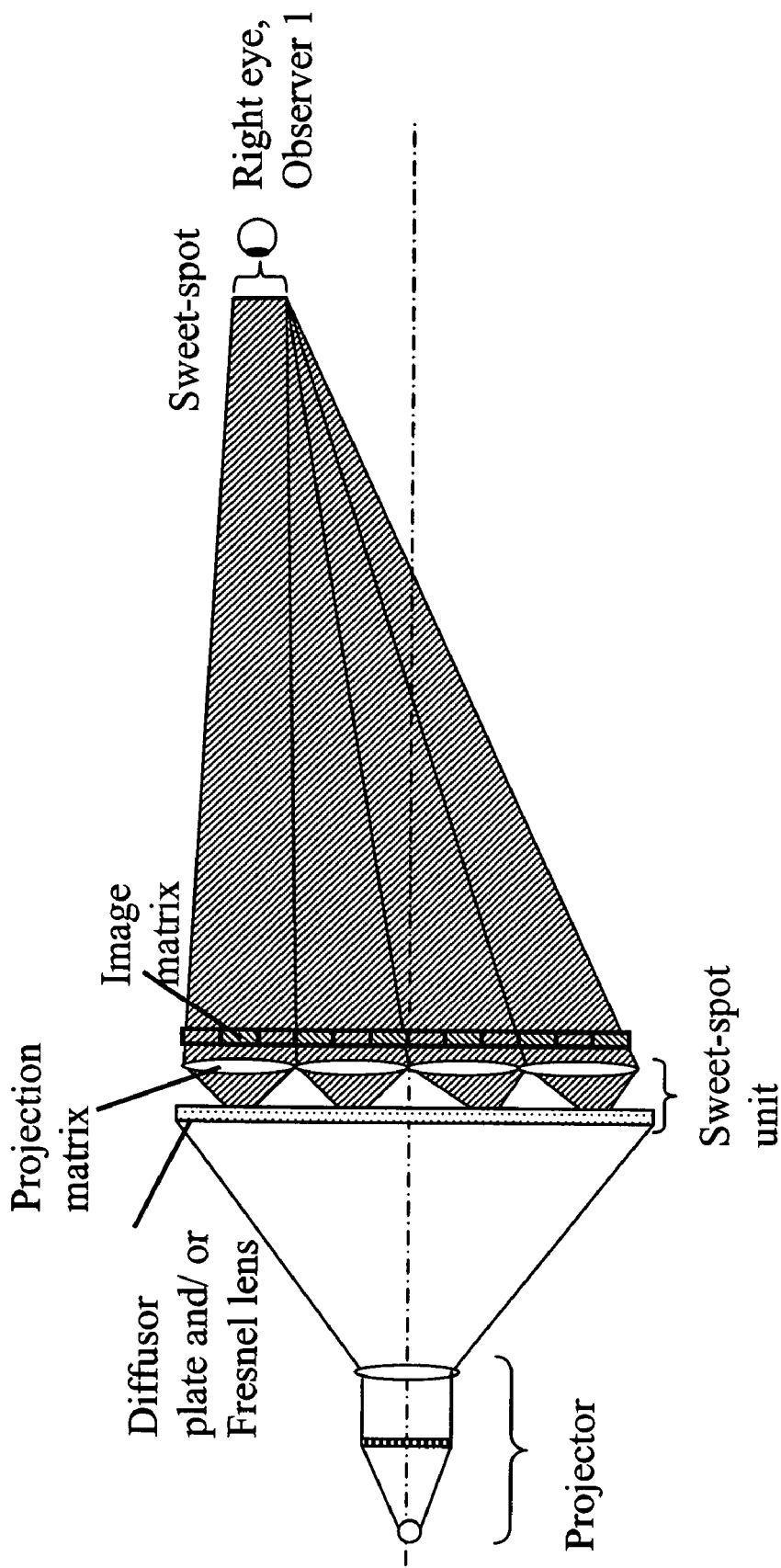
FIG. 8 is a schematic view of an embodiment of the sweet-spot unit, using a projection unit as illumination matrix.

FIG. 8 shows instead of an active shutter a projection system for one observer, said projection system being for example based on a DLP. The projection system only acts as illumination unit and replaces backlight and shutter shown in the previous Figures. As in the previous embodiments, the projection matrix generates sweet-spots, and the light is modulated by the image information contained in the image matrix. The image contents are projected into the viewing space in the form of sweet-spots, as described above.

According to this invention, it is possible to dispose a diffusor plate or a Fresnel lens in front of the projection matrix, said plate or lens directing the light onto the projection matrix.

The projection matrix of the focusing unit is shown in FIGS. 1-8 in the form of lenticulars. If each lenticular is matched with openings of the illumination matrix behind, the number of positions which can generally be addressed in the viewing space is obtained. The number of openings in the shutter is equal to or greater than the number of lenses, if the image matrix is to be viewed completely.

The image matrix is only be illuminated homogeneously if the aberrations of the projection matrix allow so. Because of the aberrations, the angle covered by a lenticular is very small, for example 0.1 rad. In order to suppress aberration effects, it is also possible to use double lenticulars instead of single lenticulars. It appears to those skilled in the art that the lenticulars may be of different designs. Both sides of the lenticulars may show in one direction, face each other or face outward. Lens arrays may also be used instead of lenticulars.

The above-described embodiments suggest a number of possible applications of autostereoscopic multi-user displays. However, this invention also covers applications which are not mentioned but which are based on the principle of the present invention.

The autostereoscopic display described above is characterised by the possibility to be run in a 2D and 3D mode, its ability to support multiple observers, the fact that it allows the observers to move freely and that it can display contents in real-time, by its high resolution, great brightness and little depth. It is robust and does not require moving mechanical parts. Thanks to its great quality features, it is well suited for high-end applications in the fields of medicine, technology, research and development, for mid-range applications, e.g. for video-conference systems and in advertising, and for low-end applications, e.g. home displays, palmtop computers, video-phones and many other applications.

The invention claimed is:

1. Autostereoscopic multi-user display, containing an illumination matrix and a projection matrix used to distribute white light as homogeneously as possible on a transmissive image matrix which contains a number of controllable pixels for sequential representation of two-dimensional images or image sequences with monoscopic and stereoscopic image contents, whereby a large area of said image matrix is permeated by said light distribution, and where said projection matrix contains a multitude of lens elements, characterised in that the illumination matrix and the projection matrix form a sweet spot unit, which is disposed in front of the image matrix (seen in the direction of light propagation), and which generates bundles of almost parallel rays with a definable extension, the light of said bundles of rays being focused in the form of sweet spots on to an eye of at least one observer, and that the illumination matrix is disposed in or close to the focal plane of the lens elements of the projection matrix;

the number of lens elements of the projection matrix is ⅓ or less than the number of pixels, so that the bundles of rays of a sweet spot simultaneously permeate a multitude of adjoining pixels;

the sweet spots assigned to the eyes of one or multiple observers are tracked according to a changing eye position.

2. Autostereoscopic multi-user display according to claim 1, characterised in that the number, extension and spatial assignment of sweet spots can be controlled freely by the sweet spot unit.

3. Autostereoscopic multi-user display according to claim 1, characterised in that the extension of the sweet spots is equal to or greater than a distance between the eyes of the respective observer.

4. Autostereoscopic multi-user display according to claim 2, characterised in that the sweet spots for the second and further observers are turned off while the first and further observers are provided with information intended for them, and that the sweet spots for the first and further observers are turned off while the second and further observers are provided with information intended for them.

5. Autostereoscopic multi-user display according to claim 1, characterised in that in the illumination matrix is an actively light-emitting element which has a linear or matrix structure, location and intensity of said structure being freely controllable.

6. Autostereoscopic multi-user display according to claim 1, characterised in that in the illumination matrix there is a projection unit including a diffusing layer and/or Fresnel lens disposed in front of the projection matrix, seen in the direction of light propagation.

7. Autostereoscopic multi-user display according to claim 1, characterised in that the illumination matrix consists of a backlight and an electronic shutter having openings, location and transmittance of said openings being freely controllable.

8. Autostereoscopic multi-user display according to claim 1, characterised in that the image matrix and the shutter have the same pixel and sub-pixel geometry.

9. Autostereoscopic multi-user display according to claim 2, characterised in that the projection matrix is wholly or partly formed by a lenticular, double lenticular, lens array, compound lens system, holographic optical element or combination thereof.

10. Autostereoscopic multi-user display according to claim 2, characterised in that the projection matrix is wholly or partly made of a material the optical properties of which are controllable.

* * * * *